(12) United States Patent
Lu et al.

(10) Patent No.: US 11,623,439 B2
(45) Date of Patent: Apr. 11, 2023

(54) ROLL FORMING DEVICE FOR PLASTIC FLOORING

(71) Applicant: WUXI BOYU PLASTIC MACHINERY CO., LTD., Jiangsu (CN)

(72) Inventors: Ding-Yi Lu, Suzhou (CN); Pei-Dong Zhao, Suzhou (CN)

(73) Assignee: WUXI BOYU PLASTIC MACHINERY Co Ltd., Wuxi (CN)

( * ) Notice: Subject to any disclaimer, the term of this patent is extended or adjusted under 35 U.S.C. 154(b) by 60 days.

(21) Appl. No.: 16/618,805

(22) PCT Filed: Jun. 6, 2018

(86) PCT No.: PCT/CN2018/000216
§ 371 (c)(1),
(2) Date: Dec. 3, 2019

(87) PCT Pub. No.: WO2018/223684
PCT Pub. Date: Dec. 13, 2018

(65) Prior Publication Data
US 2020/0086622 A1    Mar. 19, 2020

(30) Foreign Application Priority Data
Jun. 6, 2017   (CN) .......................... 201710419523.3

(51) Int. Cl.
*B32B 38/06* (2006.01)
*B29C 48/18* (2019.01)
(Continued)

(52) U.S. Cl.
CPC .............. *B32B 38/06* (2013.01); *B29C 48/18* (2019.02); *B32B 37/06* (2013.01); *E04F 15/02* (2013.01)

(58) Field of Classification Search
CPC ..... B32B 38/06; B32B 37/06; B32B 2471/00; B32B 37/0053; B32B 41/00;
(Continued)

(56) References Cited

U.S. PATENT DOCUMENTS

| 4,312,686 A * | 1/1982 | Smith | B32B 37/26 |
| | | | 156/277 |
| 2013/0097959 A1* | 4/2013 | Michel | E04F 15/02 |
| | | | 52/588.1 |
| 2015/0165748 A1* | 6/2015 | Anspach | B32B 27/20 |
| | | | 156/209 |

FOREIGN PATENT DOCUMENTS

| CN | 105711226 | 6/2016 |
| CN | 105848898 | 8/2016 |

(Continued)

OTHER PUBLICATIONS

Titow, PVC Technology, 4th Edition, Elsevier Applied Science Publishers Ltd., pp. 821-824, 1984. (Year: 1984).*
(Continued)

*Primary Examiner* — Michael N Orlando
*Assistant Examiner* — Christopher W Raimund

(57) ABSTRACT

A roll forming device for plastic flooring utilizes a printed layer unwinding mechanism, a wear-resisting unwinding mechanism and a calender to laminate a substrate layer formed by an extruder, a printed layer and a wear-resisting layer into a whole. The calender includes a gauging roller group, a pre-bonding roller group and a laminating roller group disposed on a rack. The gauging roller group, which is disposed at one side of the pre-bonding roller group and linearly opposite to a discharge port of the extruder. The pre-bonding roller group includes a large roller and a plurality of guide rollers disposed around the large roller, and at least one first heating unit is disposed in the large roller or a position corresponding to an outer edge of the roller (Continued)

surface. The laminating roller group, which is disposed at the other side of the pre-bonding roller group.

3 Claims, 4 Drawing Sheets

(51) Int. Cl.
*B32B 37/06* (2006.01)
*E04F 15/02* (2006.01)

(58) Field of Classification Search
CPC ..... B32B 37/203; B32B 37/15; B32B 37/156; B29C 48/18; E04F 15/02
See application file for complete search history.

(56) References Cited

FOREIGN PATENT DOCUMENTS

| | | | |
|---|---|---|---|
| CN | 106218184 | | 12/2016 |
| CN | 106218184 A | * | 12/2016 |
| CN | 206733640 | | 12/2017 |
| CN | 206781187 | | 12/2017 |
| WO | 2016063920 | | 4/2016 |

OTHER PUBLICATIONS

Roll Technology Corporation, Heat Transfer Rolls, Apr. 13, 2016, https://www.rolltech.com/heat-transfer-rolls.html (Year: 2016).*

* cited by examiner

ROLL FORMING DEVICE FOR PLASTIC FLOORING

CROSS-REFERENCE TO RELATED APPLICATION

This application is a 371 of international application of PCT application serial no. PCT/CN2018/000216, filed on Jun. 6, 2018, which claims the priority benefit of China application no. 201710419523.3, filed on Jun. 6, 2017. The entirety of each of the above mentioned patent applications is hereby incorporated by reference herein and made a part of this specification.

FIELD OF THE INVENTION

The present invention relates to a laminator which can be applied in the formation of plastic flooring, in particular to a laminator assembly structure which can make continuous reciprocating movements, and a forming device which applies the movable laminator to the automatic production of plastic flooring.

BACKGROUND OF THE INVENTION

Using plastic materials as a replacement for natural timber in the production of flooring to reduce the destruction of natural resources is a trend in the development of plastic flooring products nowadays. As known from the background, conventional flooring includes a printed layer and a wear-resisting layer which are adhered on the surface of a bottommost substrate, and the substrate is made generally of PVC material. Plastic flooring can be laminated by roll pressing. FIG. 4 shows a vertical four-roller calender of the prior utility model of the inventor of this case, which includes first and second conveying rollers 72A and 72B, a mirror roller 73 and a patterned roller 74 which are disposed respectively from the bottom up on a rack 71 to roll a substrate 77, a printed layer 78 conveyed by a printed layer unwinding mechanism 76 and a wear-resisting layer 79 conveyed by a wear-resisting layer unwinding mechanism 75 into a whole. Although the present case can easily and quickly roll the substrate, the printed layer and the wear-resisting layer into a whole, if the substrate is made of a hard board material and contains no oil or less oil, the efficiency of production will be decreased greatly, the quality of surface embossing is poor after plastic flooring is formed by lamination, and therefore it requires improvement.

In view of this, the inventor probed into the problems of the prior utility model mentioned above in depth, and, with years of experience in research and development and manufacturing in the related industry, actively sought solutions. After making an effort in research and development for a long term, the inventor finally successfully developed the roll forming device for plastic flooring in order to improve the problems of the prior utility model.

SUMMARY OF THE INVENTION

The main object of the present invention is to provide a roll forming device for plastic flooring. When a substrate with less oil content is used in the production of plastic flooring, the substrate layer extruded by an extruder can be laminated by a five-roller rolling device in cooperation so as to not only increase the efficiency of production but also make the embossed pattern on the surface of plastic flooring clearer and more prominent.

In order to achieve the above object of the present invention, the present invention provides a roll forming device for plastic flooring, which is characterized by including an extruder, a printed layer unwinding mechanism, a wear-resisting layer unwinding mechanism, and a calender.

The extruder is configured to form a substrate layer, with one end having a discharge port, and the substrate layer is extruded outward from the discharge port and conveyed to the calender.

The printed layer unwinding mechanism is configured to convey a printed layer to the calender.

The wear-resisting layer unwinding mechanism is configured to convey a wear-resisting layer to the calender.

With regard to the calender, a gauging roller group, a pre-bonding roller group and a laminating roller group are disposed on a rack; the gauging roller group, which includes a plurality of gauging rollers and disposed at one side of the pre-bonding roller group and linearly opposite to the discharge port of the extruder, is configured to define a thickness of the substrate layer; the pre-bonding roller group, which includes a large roller and a plurality of guide rollers disposed around the large roller, with at least one first heating unit being disposed inside the large roller or at a position corresponding to an outer edge of a roller surface of the large roller, is configured to heat the substrate layer, the printed layer and the wear-resisting layer which are pre-bonded; the laminating roller group is provided with a plurality of laminating rollers, the plurality of laminating rollers are disposed at the other side of the pre-bonding roller group, and a surface of at least one of the plurality of laminating rollers has an embossing pattern, which is used to form a clear and prominent embossed pattern on a surface of the wear-resisting layer when the substrate layer, the printed layer and the wear-resisting layer are laminated into a whole.

In the roll forming device for plastic flooring, the gauging roller group includes a first roller and a second roller which are disposed opposite to each other in a superimposing or juxtaposing manner, and a rolling space formed due to the opposite disposition between the first roller and the second roller is linearly opposite to the discharge port of the extruder.

In the roll forming device for plastic flooring, the laminating roller group includes a third roller and a fourth roller which are disposed opposite to each other in a superimposing or juxtaposing manner.

In the roll forming device for plastic flooring, two cooling conduits are disposed respectively inside the third roller and the fourth roller, and the cooling conduits can cooperate with an external device to convey a cooling liquid for cooling laminated plastic flooring.

In the roll forming device for plastic flooring, the third roller and the fourth roller are disposed in parallel on the left and the right, and when a path of conveying the substrate layer, the printed layer and the wear-resisting layer which are pre-bonded is in a vertical direction, a fourth guide roller is disposed on the same side as the laminating roller group and at a position corresponding to the roller surface of the large roller, so that the substrate layer, printed layer and wear-resisting layer which are pre-bonded are conveyed exactly along the roller surface of the large roller.

In the roll forming device for plastic flooring, the first heating unit is disposed in the large roller, and includes a conduit and an external device which cooperate to circulate hot oil.

In the roll forming device for plastic flooring, a second heating unit is disposed at a position corresponding to the roller surface of the large roller on the rack; the second heating unit is provided with an electric heater disposed in a housing; and after being electrified, the electric heater generates a high temperature, and applies the high temperature on the wear-resisting layer to soften the wear-resisting layer.

Thus, by utilizing the extrusion method to form the substrate layer and then cooperating with the five-roller calender with a heating function, the roll forming device for plastic flooring can easily and quickly laminate the substrate layer, the printed layer and the wear-resisting layer, and can produce a clear and prominent embossed pattern.

It is believed that the above objects, structures and features of the present invention can be understood in depth and concretely from the following detailed description of a preferred embodiment with respect to the technology, means and effects of the present invention taken in conjunction with the drawings.

DETAILED DESCRIPTION OF THE INVENTION

Figure 1:
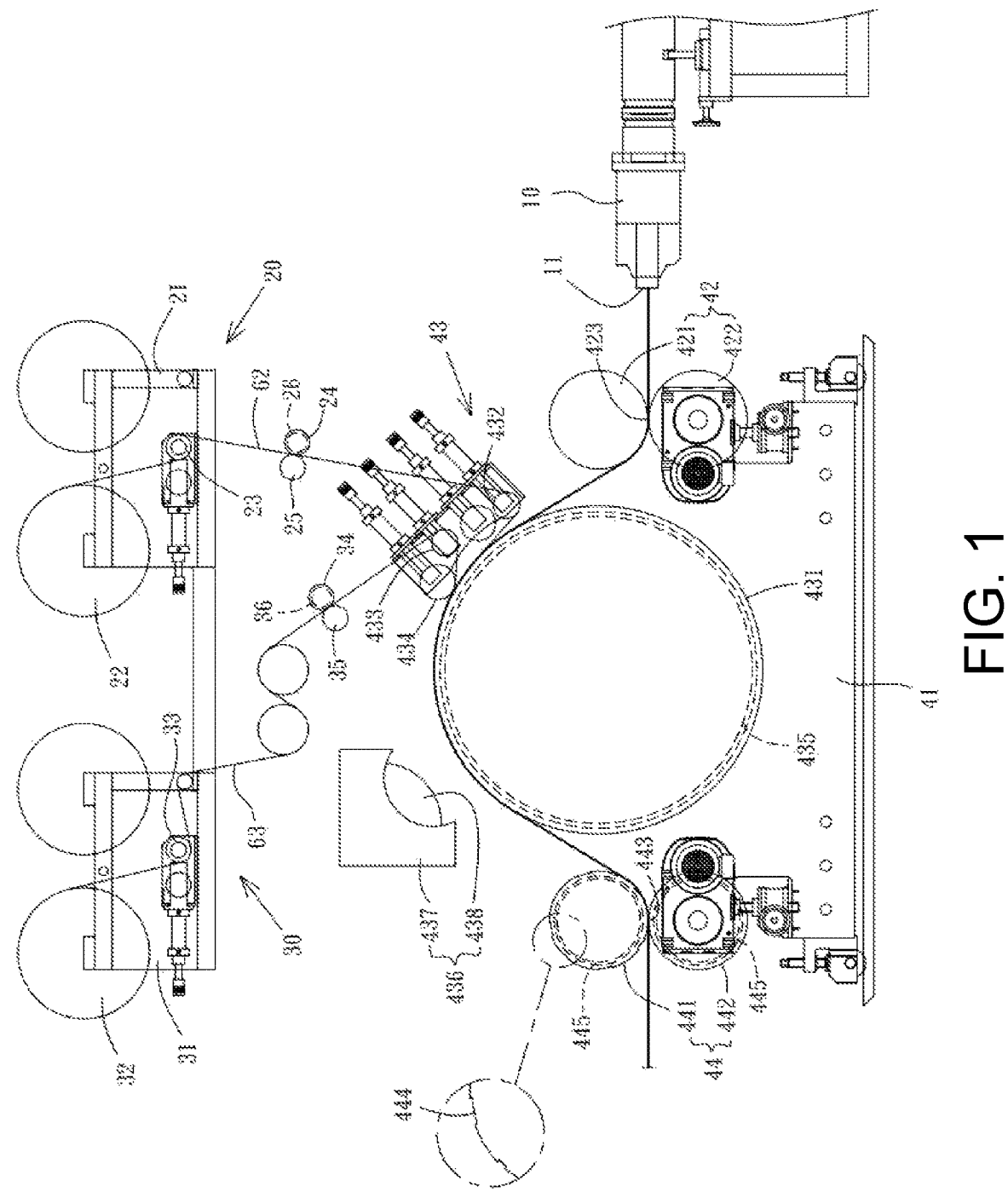
FIG. 1 is an assembly plan view of a first embodiment of the present invention.
Figure 2:
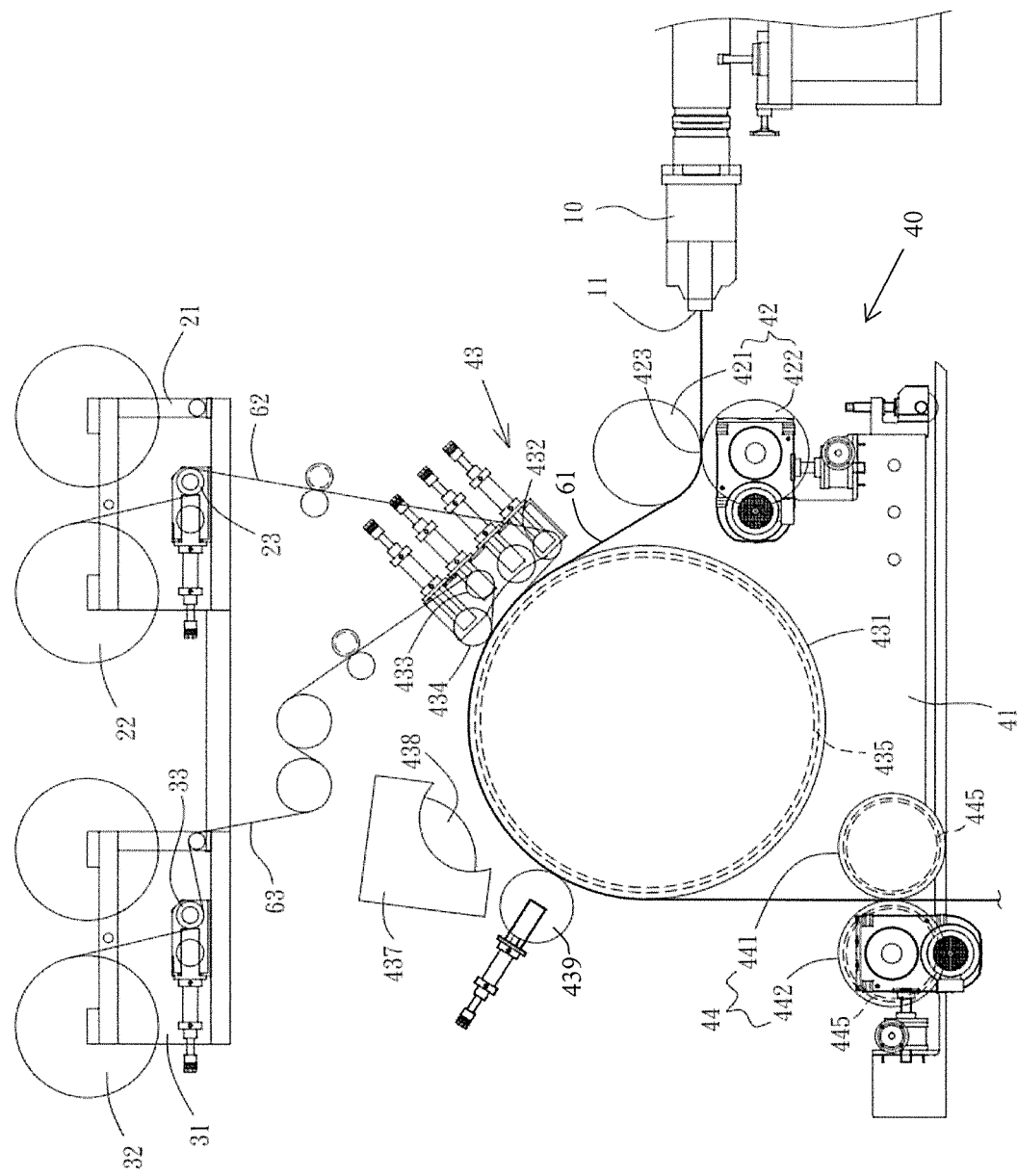
FIG. 2 is an assembly plan view of a second embodiment of the present invention.

Referring to FIGS. 1 and 2, a roll forming device for plastic flooring in the present invention includes an extruder 10, a printed layer unwinding mechanism 20, a wear-resisting layer unwinding mechanism 30, and a calender 40.

The extruder 10 is a typical plastic extruder, PVC plastic can be adopted as a raw material, with foaming agent then being added according to product requirement, and one end is provided with a discharge port 11, which is configured to extrude out a substrate layer 61 and convey the substrate layer 61 to the calender 40.

With regard to the printed layer unwinding mechanism 20, a first winding roller 22 and a plurality of first guide rollers 23 are disposed pivotally on a first carrier 21; with a printed layer 62 wound on the first winding roller 22, the first winding roller 22 can cooperate with a first pinch roller 24 and a fourth guide roller 25 to guide and convey the printed layer 62 to the calender 40; and the first pinch roller 24 is driven by a first motor 26 to provide power for assisting in conveying the printed layer 62.

With regard to the wear-resisting layer unwinding mechanism 30, a winding roller 32 and a plurality of second guide rollers 33 are disposed pivotally on a second carrier 31; with a wear-resisting layer 63 wound on the second winding roller 32, the second winding roller 32 can cooperate with a second pinch roller 34 and a fifth guide roller 35 to guide and convey the wear-resisting layer 63 to the calender 40; and the second pinch roller 34 is driven by a second motor 36 to provide power for assisting in conveying the wear-resisting layer 63.

The calender 40, which is configured to pre-bond, pre-heat and then roll the substrate layer 61, the printed layer 62 and the wear-resisting layer 63 into a whole, includes a rack 41, a gauging roller group 42, a pre-bonding roller group 43 and a laminating roller group 44 are disposed on the rack 41.

The gauging roller group 42 may include a first roller 421 and a second roller 422 which are disposed opposite to each other in a superimposing or juxtaposing manner, a rolling space 423 is formed between the first roller 421 and the second roller 422, and the rolling space 423 is linearly opposite to the discharge port 11 of the extruder 10 to define a thickness of the substrate layer 61 passing therethrough.

The pre-bonding roller group 43 includes a large roller 431, and a first guide roller 432, a second guide roller 433 and a third guide roller 434 disposed around the large roller 431, with a first heating unit 435 being disposed inside the large roller 431. The first guide roller 432 is configured to guide the printed layer 62 to be pre-bonded along the circular arc-shaped surface of the large roller 431, while the second guide roller 433 and the third guide roller 434 are configured to guide the wear-resisting layer 63 to be pre-bonded along the circular arc-shaped surface of the large roller 431; and the first heating unit 435 includes a plurality of conduits which cooperate with an external device (not shown) to circulate hot oil in order to heat the substrate layer 61, the printed layer 62 and the wear-resisting layer 63 which are pre-bonded. Moreover, in order to enhance the heating effect, a second heating unit 436 is disposed additionally at a position corresponding to the roller surface of the large roller 431 on the rack 41; the second heating unit 436 is provided with an electric heater 438 disposed in a housing 437; and after being electrified, the electric heater 438 can generate a high temperature, and applies the high temperature on the wear-resisting layer 63 to enhance the effect of softening the wear-resisting layer 63. Furthermore, the large roller 431 is driven by a power element, and the rotational speed of the large roller 431 can be controlled by an electric control system to synchronize with the rotational speeds of the first motor 26 and the second motor 36.

The laminating roller group 44, which is disposed at the other side of the pre-bonding roller group 43, may include a third roller 441 and a fourth roller 442 which are disposed opposite to each other in a superimposing or juxtaposing manner, and a laminating space 443 is formed between the third roller 441 and the fourth roller 442 to laminate the substrate layer 61, the printed layer 62 and the wear-resisting layer 63 into a whole; and with an embossing pattern 444 formed on the surface of the third roller 441, the third roller 441 can form a clear and prominent embossed pattern on the surface of the wear-resisting layer 63 when the substrate layer 61, the printed layer 62 and the wear-resisting layer 63 are laminated into a whole. In addition, two cooling conduits 445 may be disposed respectively inside the third roller 441 and the fourth roller 442, and the cooling conduits 445 can cooperate with an external device to convey a cooling liquid to cool laminated plastic flooring. Moreover, as shown in FIG. 2, if the laminating roller group 44 is disposed in parallel on the left and the right and the path of conveying the substrate layer 61, the printed layer 62 and the wear-resisting layer 63 which are pre-bonded is in a vertical direction, a fourth guide roller 439 can be disposed on the same side as the laminating roller group 44 and corresponding to a position of the roller surface of the large roller 431, so that the substrate layer 61, the printed layer 62 and the wear-resisting layer 63 which are pre-bonded are conveyed exactly along the roller surface of the large roller 431.

Figure 3:
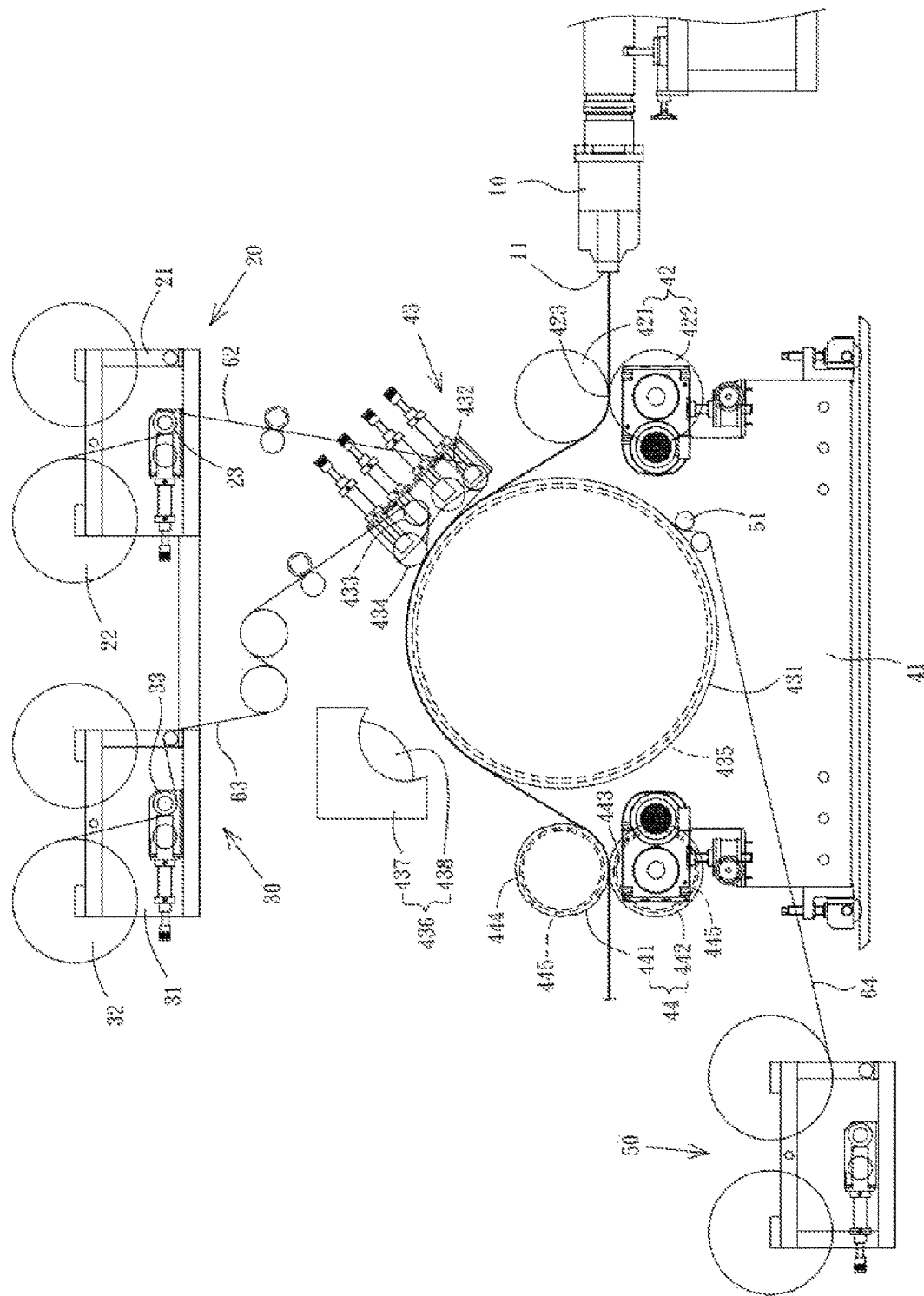
FIG. 3 is an assembly plan view of a third embodiment of the present invention.
Figure 4:
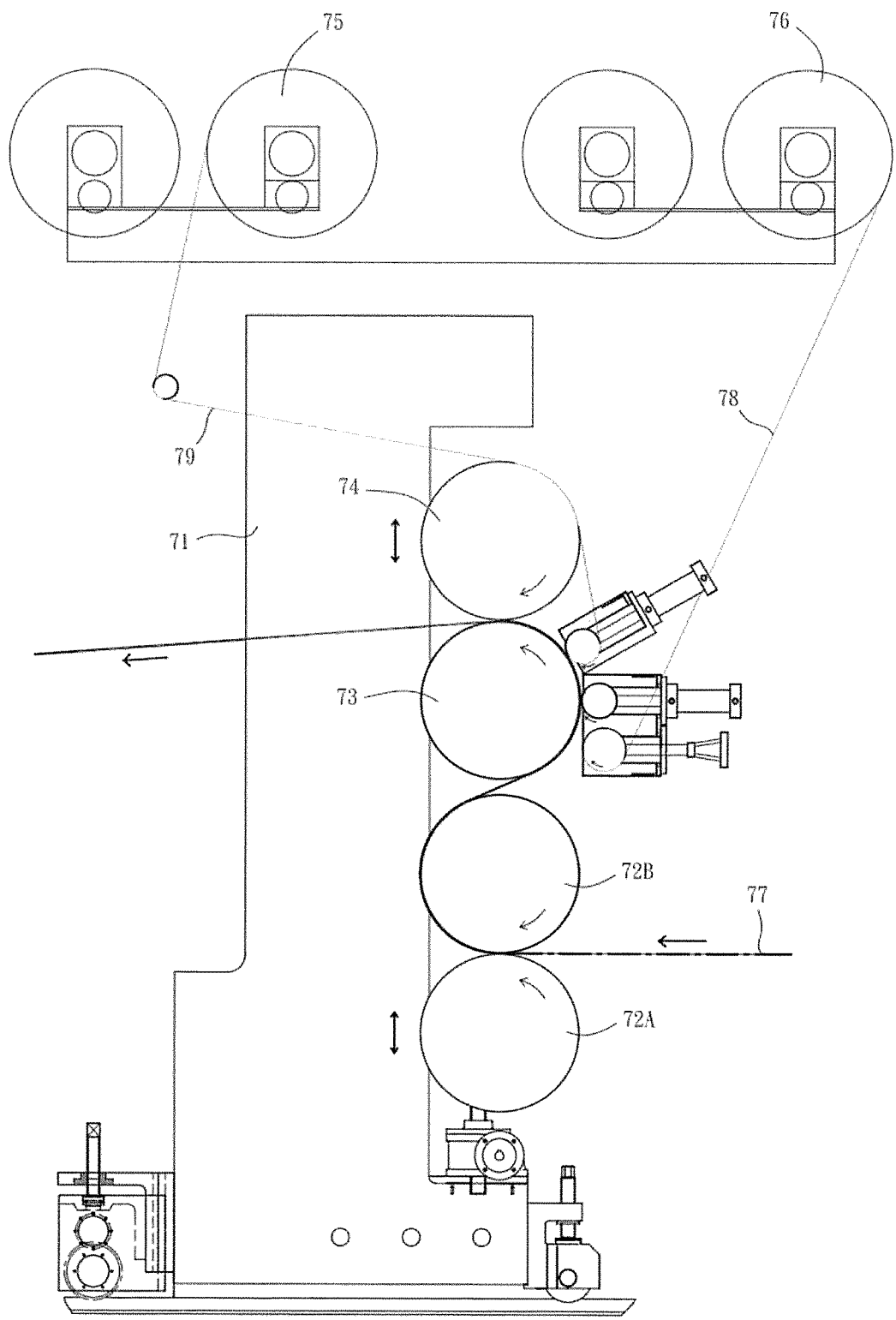
FIG. 4 is an assembly plan view of the prior utility model.

In addition, as shown in FIG. 3, a film layer 64 may also be disposed on the bottom surface of the substrate layer 61, and a film layer unwinding mechanism 50 can be utilized to wind the film layer 64 and cooperate with a plurality of third guide rollers 51 to convey the film layer 64 to the pre-bonding roller group 43 in order to improve the comfort of plastic flooring in use.

Thus, by utilizing the extrusion method to form the substrate layer 61 and then directly conveying the substrate layer 61 to the calender 40, under the assistance of the gauging roller group 42, the pre-bonding roller group 43, the laminating roller group 44, the first heating unit 435 and the second heating unit 436, the roll forming device for plastic flooring not only can easily and quickly laminate the substrate layer 61, the printed layer 62 and the wear-resisting layer 63, and but also can produce a clear and prominent embossed pattern indeed.

To sum up, the present invention has excellent progressive practicability among like products. Moreover, no like structures have been found existing in all domestic and foreign technical documents and literatures associated with such a structure prior to the present invention, so the present invention has possessed the requirements of a patent for the invention applied for according to the law indeed.

The aforementioned embodiments are intended to be illustrative only of the present invention, and various variations, modifications and applications which are made by those skilled in the art without departing from the spirit of the present invention shall fall into the scope of the present invention.

What is claimed is:

1. A roll forming device for plastic flooring, wherein the roll forming device for plastic flooring comprises an extruder, a printed layer unwinding mechanism, a wear-resisting layer unwinding mechanism, and a calender, wherein,
    the extruder is configured to form a substrate layer, with one end having a discharge port, and the substrate layer is extruded outward from the discharge port and conveyed to the calender;
    the printed layer unwinding mechanism is configured to convey a printed layer to the calender;
    the wear-resisting layer unwinding mechanism is configured to convey a wear-resisting layer to the calender;
    with regard to the calender, a gauging roller group, a pre-bonding roller group and a laminating roller group are disposed on a rack; the gauging roller group, which comprises a plurality of gauging rollers and is disposed at one side of the pre-bonding roller group and linearly opposite to the discharge port of the extruder, is configured to define a thickness of the substrate layer; the pre-bonding roller group, which comprises a main roller and a plurality of guide rollers disposed around the main roller, with at least one first heating unit being disposed inside the main roller and at a first position under a whole roller surface of the main roller, is configured to heat the whole roller surface of the main roller and the substrate layer, the printed layer and the wear-resisting layer which are pre-bonded; the laminating roller group comprises two laminating rollers, the laminating rollers are disposed at a side of the main roller, no roller is located between the laminating rollers and the main roller, and a surface of at least one of the laminating rollers has an embossing pattern, which is used to form an embossed pattern on a surface of the wear-resisting layer when the substrate layer, the printed layer and the wear-resisting layer are laminated into a whole, the printed layer and the wear-resisting layer are laminated into a whole by the two laminating rollers,
    wherein the first heating unit comprises a conduit and an external device which cooperate to circulate hot oil;
    wherein the gauging rollers comprises a first roller and a second roller which are disposed opposite to each other in a superimposing or juxtaposing manner, and a rolling space formed due to the opposite disposition between the first roller and the second roller is linearly opposite to the discharge port of the extruder;
    wherein the laminating rollers are disposed opposite to each other in a superimposing or juxtaposing manner;
    wherein two cooling conduits are disposed respectively inside the laminating rollers, and the cooling conduits cooperate with an external device to convey a cooling liquid for cooling laminated plastic flooring.

2. The roll forming device for plastic flowing according to claim 1, wherein the laminating rollers are disposed in parallel on the left and the right, and when a path of conveying the substrate later, printed layer and wear-resisting layer which are pre-bonded is in a vertical direction, a fourth guide roller is disposed on the same side as the laminating roller group and at a second position corresponding to the roller surface of the main roller, so that the substrate layer, the printed layer and the wear-resisting layer which are pre-bonded are conveyed exactly along the roller surface of the main roller.

3. The roll forming device for plastic flooring according to claim 1, wherein a second heating unit is disposed at a third position corresponding to the roller surface of the main roller on the rack; the second heating unit is provided with an electric heater disposed in a housing; and after being electrified, the wear-resisting layer is heated by the electric heater so as to siften the wear-resisting layer.

* * * * *